(12) United States Patent
Pierrejean et al.

(10) Patent No.: US 6,354,141 B1
(45) Date of Patent: Mar. 12, 2002

(54) VARIABLE SPEED PRIMARY PUMPING IN A TRACER GAS LEAK DETECTOR

(75) Inventors: Didier Pierrejean, Villaz; Frédéric Rouveyre, Chavanod; Bertrand Seigeot, Dingy Saint Clair, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/457,386

(22) Filed: Dec. 9, 1999

(30) Foreign Application Priority Data

Dec. 10, 1998 (FR) ............................................ 98 15579

(51) Int. Cl.$^7$ ................................................. G01M 3/20
(52) U.S. Cl. ............................................................ 73/40.7
(58) Field of Search ......................................... 73/40.7

(56) References Cited

U.S. PATENT DOCUMENTS

| | | | | |
|---|---|---|---|---|
| 4,779,449 A | * | 10/1988 | Bley et al. .................... | 73/40.7 |
| 5,193,380 A | * | 3/1993 | Tallon .......................... | 73/40.7 |
| 5,561,240 A | | 10/1996 | Ochiai et al. ................ | 73/40.7 |
| 5,585,548 A | | 12/1996 | Grosse Bley et al. | |
| 5,668,328 A | | 9/1997 | Steber et al. | |

FOREIGN PATENT DOCUMENTS

| | | | | |
|---|---|---|---|---|
| EP | 0 464 292 A1 | 1/1992 | | |
| FR | 2 657 164 A1 | 7/1991 | ................. | 73/40.7 |
| FR | 2 666 410 A1 | 3/1992 | ................. | 73/40.7 |
| FR | 2 734 053 A1 | 11/1996 | ................. | 73/40.7 |
| JP | 57-169647 | * 10/1982 | ................. | 73/40.7 |

* cited by examiner

*Primary Examiner*—Daniel S. Larkin
(74) *Attorney, Agent, or Firm*—Sughrue Mion, PLLC

(57) ABSTRACT

In a system in accordance with the invention for detecting leaks, a mass spectrometer is connected to the aspiration side of a secondary pump whose discharge side is connected to the aspiration side of a primary pump driven by a rotational drive system adapted to vary the rotation speed of the primary pump between at least two different rotation speeds. An aspiration inlet is selectively connected by control valves either to the aspiration side of the primary pump or to the aspiration side or an intermediate area of the secondary pump. Variation of the rotation speed of the primary pump is used to perform faster pre-evacuation before the test, to detect grosser leaks, to compensate for a high level of outgassing or to adapt the sensitivity of the device, and equally to eliminate helium background noise from the primary pump.

8 Claims, 1 Drawing Sheet

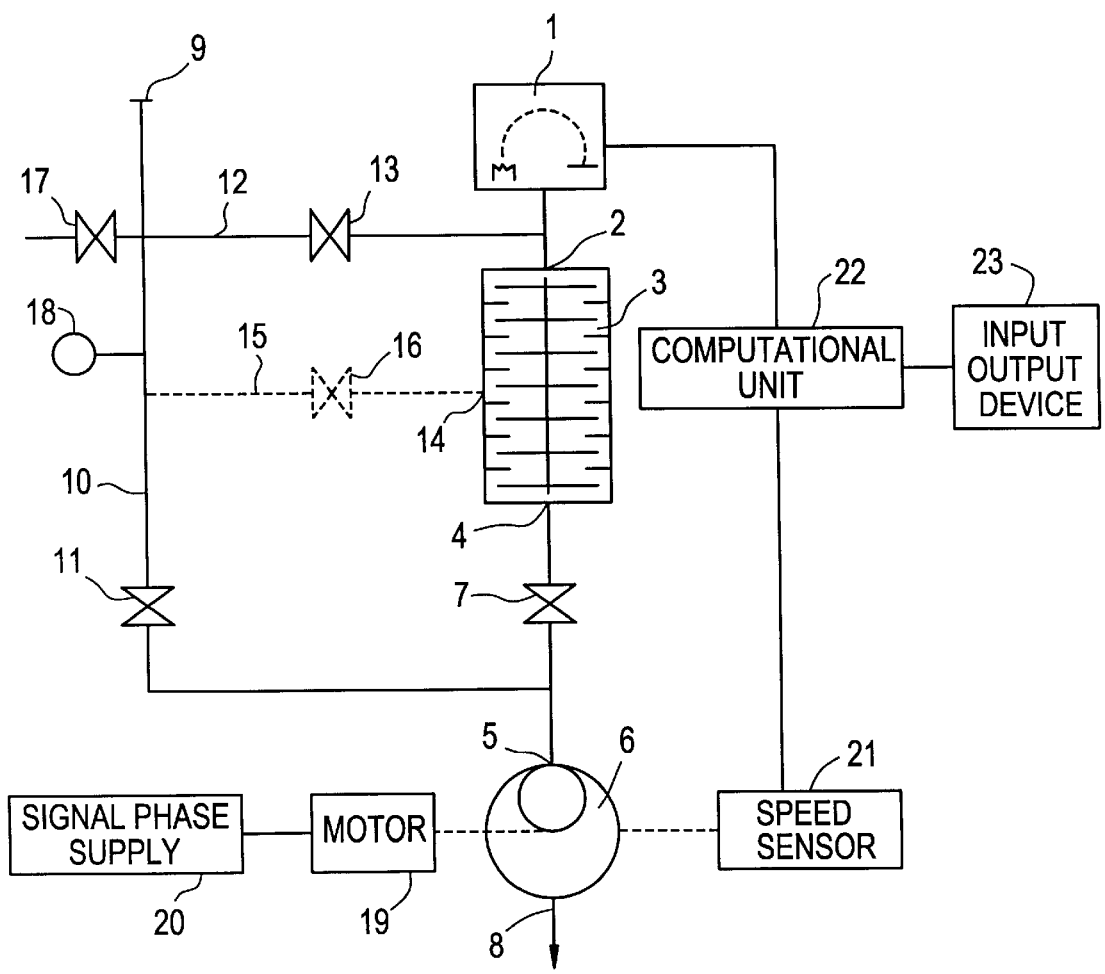

VARIABLE SPEED PRIMARY PUMPING IN A TRACER GAS LEAK DETECTOR

The present invention relates to methods and systems for detecting leaks by aspirating gases at an aspiration inlet and detecting a tracer gas, such as helium, by means of a detector, such as a mass spectrometer, associated with primary and secondary pumps.

BACKGROUND OF THE INVENTION

In prior art methods and systems of the above kind, a mass spectrometer is connected to the aspiration side of a secondary pump whose discharge side is connected to the aspiration side of a primary pump driven by a rotary drive system. The gases are aspirated via a detector input that can be selectively connected by control valves either to the aspiration side of the secondary pump or to the discharge side or an intermediate area of the secondary pump.

In a leak detector of the above kind using a mass spectrometer, there are three basic test modes:

a. the total contraflow test, in which the aspiration input of the detector is connected to the discharge side of the secondary pump and thus to the aspiration side of the primary pump: the mass spectrometer then detects the contraflow of a fraction of a tracer gas, such as helium, in the secondary pump;

b. the direct test, in which the aspiration inlet of the detector is connected to the aspiration side of the secondary pump, i.e. to the input of the mass spectrometer: the mass spectrometer then detects directly the tracer gas, such as helium, coming from the input of the detector;

c. the semi-direct or partial contraflow test, in which the aspiration inlet of the detector is connected to an intermediate area between the aspiration side and the discharge side of the secondary pump: the mass spectrometer then detects the contraflow of the tracer gas, such as helium, in the portion of the secondary pump between the connection area of the aspiration inlet of the detector and the aspiration side of the secondary pump.

In practice, during a first pre-evacuation stage, the inlet of the detector is generally connected to the aspiration side of the primary pump, which aspirates the gases until an intermediate pressure threshold enabling the total contraflow test is reached. The intermediate threshold depends on the secondary pump, but is generally in the order of $10^{-1}$ hPa to 10 hPa.

When the pressure threshold is reached on the aspiration side of the primary pump, the secondary pump can operate correctly. Its discharge side is then connected to the aspiration side of the primary pump by opening a connecting valve and a total contraflow test step can be carried out.

Subsequently, when the pressure at the inlet of the detector has reached a lower pressure threshold which is sufficiently low, generally less than $10^{-2}$ hPa, the direct test mode can be selected by connecting the inlet of the detector directly to the aspiration side of the secondary pump and disconnecting its connection to the aspiration side of the primary pump.

Clearly the characteristics of the primary pump used on the leak detector directly affect the performance of the detector. This is because the pumping speed of the primary pump determines the duration of the pre-evacuation phase or the waiting time before the test can begin. The pumping speed of the primary pump also determines the maximum flow which can be admitted to the detector for the mass spectrometer to be able to detect the tracer gas effectively in a total contraflow test. Equally, the aspiration speed of the primary pump determines the sensitivity and the response time of the detector when it is used in the total contraflow test mode. Finally, the primary pump generally has a limited capacity to evacuate the tracer gas downstream of the secondary pump, and this produces a spurious signal from the mass spectrometer, resulting from the contraflow of tracer gas through the secondary pump in the direct or semi-direct test mode.

OBJECTS AND SUMMARY OF THE INVENTION

A first problem addressed by the present invention is that of reducing the pre-evacuation time in order to begin the test as quickly as possible with the same primary pump.

Another problem addressed by the invention is that of enabling a leak detector to detect larger leaks or to compensate for a high level of outgassing with the same primary pump.

Another problem addressed by the invention is that of adapting the sensitivity of the leak detector to the characteristics of the leak to be detected, using the same primary pump.

Another problem addressed by the present invention is that of eliminating helium background noise from the primary pump by eliminating the spurious signal resulting from the contraflow of tracer gas, such as helium, in the secondary pump during a direct mode test.

To achieve the above and other objects, the invention provides a method of detecting leaks by aspirating gases at an aspiration inlet and by detecting a tracer gas by means of a detector, such as a mass spectrometer, associated with a primary pump and a secondary pump, the method comprising at least a first aspiration step during which the primary pump is driven in rotation in a first speed range and a second aspiration step during which the primary pump is driven in rotation at a second speed outside the first speed range.

In a first embodiment of the invention, the second speed is the nominal speed of the primary pump and the speeds of the first speed range are greater than the nominal speed of the primary pump.

In a first application of the invention, the first speed range is used during a limited first pre-evacuation step period during which the aspiration inlet is connected directly to the aspiration side of the primary pump.

In a second application of the invention, the first speed range is used during a total contraflow test step to compensate for a high level of outgassing or to detect grosser leaks.

In a second embodiment of the invention, the speeds of the first speed range are less than the nominal speed of the primary pump and the first speed range is used during a total contraflow test step to reduce the pumping speed and thereby increase the sensitivity of detection.

In a third embodiment of the invention, the first and second speeds being different, the speeds and the signals produced by the detector, such as the mass spectrometer, during each of the two aspiration steps are stored, and the stored values are used to compute the usable signal resulting from the tracer gas coming from the aspiration inlet by subtracting the spurious signal resulting from the contraflow of tracer gas through the secondary pump.

In a particularly advantageous application of the third embodiment of the invention:

the rotation speed of the primary pump is partially modulated with a low-frequency alternating speed component, the modulated component is dissociated in the total signal coming from the mass spectrometer, and the spurious signal associated with the rotation speed of the primary pump is computed from the modulated component and the degree of modulation of the rotation speed of the primary pump and subtracted from the total signal to deduce the usable signal therefrom in real time.

A leak detector system in accordance with the invention for implementing the above method comprises a mass spectrometer connected to the aspiration side of a primary pump driven by a rotational drive system, with an aspiration inlet selectively connectable by control valves either to the aspiration side of the primary pump or to the aspiration side or an intermediate area of the secondary pump; the rotational drive system of the primary pump is adapted to vary the rotation speed of the primary pump between at least two different rotation speeds.

A rotational drive system can advantageously be provided that is adapted to modulate the rotation speed of the primary pump with a low-frequency alternating speed component.

In this case, a speed sensor can advantageously be provided for measuring the rotation speed of the primary pump, means for storing the time sequence of signals from said speed sensor and signals produced by the mass spectrometer, and computation means for computing the usable signal from the stored signals.

BRIEF DESCRIPTION OF THE DRAWING

Other objects, features, and advantages of the present invention will emerge from the following description of particular embodiments of the invention which is given with reference to the accompanying drawing, the single figure of which is a diagrammatic representation of the structure of a leak detector in accordance with the present invention.

MORE DETAILED DESCRIPTION

In the embodiment of the invention shown in the figure, the leak detector device in accordance with the invention comprises a detector, such as a mass spectrometer 1, connected to the aspiration side 2 of a secondary pump 3 whose discharge side 4 is connected to the aspiration side 5 of a primary pump 6 by a pipe fitted with a gross leak test valve 7. The discharge side 8 of the primary pump 6 discharges the gases to atmosphere.

An aspiration inlet 9 of the leak detector device is connected to the aspiration side 5 of the primary pump 6 by a pre-evacuation pipe 10 fitted with a pre-evacuation valve 11. The aspiration inlet 9 is also connected to the aspiration side 2 of the secondary pump 3 by a direct pipe 12 fitted with a direct test valve 13 and/or to an intermediate area 14 of the secondary pump 3 by a semi-direct pipe 15 fitted with a semi-direct test valve 16.

An air inlet valve 17 selectively admits air to the aspiration inlet 9. A pressure gauge 18 is used to measure the pressure in the pre-evacuation pipe 10.

The primary pump 6 can be a vane pump capable of producing on its aspiration side 5 a gas pressure that is sufficiently low, for example in the order of $10^{-1}$ hPa to 10 hPa, to enable the operation of a secondary pump 3, itself producing on its aspiration side 2 a pressure low enough, for example less than $10^{-4}$ hPa, to be compatible with the operation of a mass spectrometer 1.

In accordance with the invention, the primary pump 6 is driven in rotation by a rotary drive system which can vary the rotation speed of the primary pump 6 between at least two different rotation speeds V1 and V2. For example, a three-phase motor 19 can be used connected to a single-phase supply 20 enabling a variable rotation speed to be obtained independently of the frequency and the voltage of the mains power supply.

A speed sensor 21 measures the rotation speed of the primary pump and produces a signal which is sent to a computation unit 22, such as a microprocessor or a microcontroller, which also receives measurement signals produced by the detector, such as the mass spectrometer 1, and which delivers computation results on an input-output device 23, such as a screen or a printer.

During a first operating step, or pre-evacuation step, the primary pump 6 and secondary pump 3 are driven in rotation, the direct test valve 13 or semi-direct test valve 16 is closed, the gross leak test valve 7 is closed and the air inlet valve 17 is closed. The pre-evacuation valve 11 is then opened so that the primary pump 6 aspirates directly the gases from the aspiration inlet 9 and discharges them to atmosphere. As a result of this aspiration, the pressure of the gases at the aspiration inlet 9, which is measured by the pressure gauge 18, is progressively reduced.

The pumping speed of the primary pump 6 is directly related to its rotation speed, at least in a particular range. Accordingly, during this pre-evacuation step, the primary pump 6 is driven in rotation at a first speed V1 which is significantly greater than its nominal speed. For example, if the primary pump 6 is a vane pump, its rotation speed can be doubled, which halves the time needed to reduce the pressure of the gases to an intermediate threshold in the order of $10^{-1}$ hPa to 10 hPa which enables the start of testing by the mass spectrometer 1.

When the appropriate intermediate gas pressure threshold is reached at the aspiration inlet 9 and in the pre-evacuation pipe 10, the test can begin because the mass spectrometer 1 is then capable of producing a signal imaging the quantity of tracer gas present on the aspiration side of the secondary pump 3. The gross leak test valve 7 is then opened and the mass spectrometer 1 detects the contraflow of tracer gas, such as helium, through the secondary pump 3. The primary pump 6 can then operate at its nominal speed V2.

During the total contraflow mode test step, the maximum flow of gases at the aspiration inlet 9 is directly related to the characteristics of the primary pump 6. If necessary, the primary pump 6 is driven in rotation in a first speed range V1 greater than the nominal speed V2 so that the primary pump 6 absorbs more of the gas flow, and therefore makes it possible to reach a pressure compatible with the operation of the detector, such as the mass spectrometer 1.

Alternatively, during this total contraflow test step, the sensitivity of the leak detector system is directly related to the speed of pumping of the tracer gas by the primary pump 6. This is because, for a constant tracer gas compression ratio of the secondary pump 3, the partial pressure of the tracer gas seen by the detector such as the mass spectrometer 1 is proportional to the partial pressure of the tracer gas on the aspiration side of the primary pump 6. Moreover, the partial pressure of the tracer gas on the aspiration side of the primary pump 6 is inversely proportional to the speed of the pumping of the tracer gas by the primary pump 6, which is in turn proportional to its rotation speed V. If the rotation speed V is decreased, the pumping speed is decreased commensurately and this increases in the same proportions the partial pressure of the tracer gas as seen by the detector such as the mass spectrometer and therefore the sensitivity of the leak detector system. The sensitivity of the system can therefore be increased by reducing the rotation speed V of the primary pump 6. The adjustment can be by a factor of as much as five or more for a vane pump, which has a very significant effect on the performance of the detector.

As aspiration of the gases by the primary pump 6 continues, a lower pressure threshold can be reached at the aspiration inlet 9 and in the pre-evacuation pipe 10 which is low enough, generally less than $10^{-4}$ hPa, to enable direct operation of the detector, such as the mass spectrometer, 1. The next stage is a direct test step selected by closing the pre-evacuation valve 11 and opening the direct test valve 13 (or the semi-direct test valve 16 for a semi-direct test). In normal operation, the primary pump 6 is driven in rotation at its nominal speed V2. The detector, such as the mass spectrometer, 1 then detects the tracer gas coming directly from the aspiration inlet 9. However, this measurement is disrupted by unwanted contraflow of the tracer gas, such as helium, through the secondary pump 3 from the primary pump 6. This produces at the output of the mass spectrometer 1 a spurious signal referred to as helium background noise. The signal S at the output of the detector, such as the mass spectrometer, 1 is deemed to consist of the sum of a usable signal Su and a spurious signal Sp.

It has been found that the spurious signal Sp varies in inverse proportion to the rotation speed V of the primary pump 6 over a particular range of speed variation. For a constant rotation speed V2 of the primary pump 6, for example equal to its nominal speed, the signal at the detector, such as the mass spectrometer, 1 is constant and takes a given value S2. Modifying the rotation speed V of the primary pump 6 to a value V1, produces a signal S1 different from the signal S2 at the output of the detector, such as the mass spectrometer, 1.

Exploiting this observation, the invention proposes to vary the rotation speed V of the primary pump 6 by a known fraction K of its average speed, for example by using two successive constant speeds V1 and V2 or by modulating the rotation speed V with a low-frequency alternating speed component. A sinusoidal component at 1 Hz may be considered. The detector such as the mass spectrometer 1 supplies a signal S varying between two extreme values S1 and S2.

To calculate the spurious signal Sp resulting from the contraflow of tracer gas, such as helium, through the secondary pump 3, it is assumed to a first approximation that the ratio between the amplitude of the modulated part and the mean component of the signal is the same for the quantity of tracer gas present on the aspiration side 5 of the primary pump 6 and for the rotation speed of the primary pump 6.

It is assumed that the quantity of tracer gas in contraflow in the secondary pump is proportional to the quantity of tracer gas present on the aspiration side of the primary pump. Consequently, assuming that the variation (S1−S2) of the signal S is equal to the variation of the spurious signal Sp, and that the relative variation of the spurious signal Sp is, to a first approximation, substantially equal to the relative variation of speed K=2·(V1−V2)/(V1+V2) of the primary pump 6, it is then possible to calculate the average component Sp=(S1−S2)/K of the spurious signal and to subtract it from the total signal S measured by the mass spectrometer to obtain the usable signal component Su coming only from the tracer gas from the aspiration inlet 9.

Accordingly, knowing the average speed of the primary pump 6 and by how much its speed is modulated, and the amplitude of modulation of the signal produced by the mass spectrometer 1, it is possible to deduce the theoretical value Sp of the total spurious signal to be subtracted from the total S to obtain the usable signal Su resulting from detection of only the tracer gas from the aspiration inlet 9.

To implement the above computation method, the speed sensor 21 supplies the computation unit 22 with a signal imaging the instantaneous rotation speed V of the primary pump 6 and the mass spectrometer 1 supplies to the computation unit 22 the time sequence of tracer gas quantity measurement signals S. The computation unit 22 stores the time sequences of speed signals V and gas measurement signals S and deduces therefrom in real time the usable signal Su sent to the input-output device 23.

The present invention is not limited to the embodiments explicitly described but includes variants and generalizations thereof that will be evident to the skilled person.

What is claimed is:

1. Method of detecting leaks by aspirating gases at an aspiration inlet and by detecting a tracer gas by means of a detector associated with a primary pump and a secondary pump, the method comprising at least a first aspiration step during which the primary pump is driven in rotation in a first speed range, and a second aspiration step during which the primary pump is driven in rotation at a second speed outside the first speed range, and wherein the second speed is a nominal speed of the primary pump and the speeds of the first speed range are greater than the nominal speed of the primary pump.

2. Method according to claim 1, wherein the first speed range is used during a limited first pre-evacuation step period during which the aspiration inlet is connected directly to the aspiration side of the primary pump.

3. Method according to claim 1, wherein the first speed range is used during a total contraflow test step to compensate for a high level of outgassing or to detect grosser leaks.

4. Method of detecting leaks by aspirating gases at an aspiration inlet and by detecting a tracer gas by means of a detector associated with a primary pump and a secondary pump, the method comprising at least a first aspiration step during which the primary pump is driven in rotation in a first speed range, and a second aspiration step during which the primary pump is driven in rotation at a second speed outside the first speed range, and wherein the speeds of the first speed range are less than a nominal speed of the primary pump, and the first speed range is used during a total contraflow test step to reduce the pumping speed and thereby increase the sensitivity of detection.

5. Method of detecting leaks by aspirating gases at an aspiration inlet and by detecting a tracer gas by means of a detector associated with a primary pump and a secondary pump, the method comprising at least a first aspiration step during which the primary pump is driven in rotation in a first speed range, and a second aspiration step during which the primary pump is driven in rotation at a second speed outside the first speed range, and wherein, during a direct test step, the speeds and the signals produced by the detector during each of the two aspiration steps are stored, and the stored values are used to compute a usable signal Su resulting from the tracer gas coming from the aspiration inlet by subtracting a spurious signal Sp resulting from a contraflow of tracer gas through the secondary pump.

6. Method according to claim 5, wherein:

the rotation speed V of the primary pump is partially modulated with a low-frequency alternating speed component, the modulated component is dissociated in a total signal S coming from the detector, and the spurious signal Sp associated with the rotation speed V of the primary pump is computed from the modulated component and the degree of modulation of the rotation speed of the primary pump and subtracted from the total signal S to deduce the usable signal Su therefrom in real time.

7. Leak detector system for detecting leaks by aspirating gases at an aspiration inlet and by detecting a tracer gas by a detector associated with a primary pump and a secondary pump, including at least a first aspiration step during which the primary pump is driven in rotation in a first speed range, and a second aspiration step during which the primary pump is driven in rotation at a second speed outside the first speed range, comprising:

the detector connected to the aspiration side of the primary pump driven by a rotational drive system, with the aspiration inlet selectively connectable by control valves either to the aspiration side of the primary pump or to the aspiration side or an intermediate area of the secondary pump, wherein the rotational drive system of the primary pump is adapted to vary a rotation speed V of the primary pump between at least two different rotation speeds, and wherein the rotational drive system of the primary pump is adapted to modulate the rotation speed V of the primary pump with a low-frequency alternating speed component.

8. The system according to claim 7, comprising a speed sensor for measuring the rotation speed V of the primary pump, means for storing a time sequence of signals V from said speed sensor and signals S produced by the detector, and computation means for computing a usable signal Su from the stored signals.

* * * * *